(12) United States Patent
Pratik et al.

(10) Patent No.: US 11,700,070 B2
(45) Date of Patent: Jul. 11, 2023

(54) HYPERNETWORK KALMAN FILTER FOR CHANNEL ESTIMATION AND TRACKING

(71) Applicant: QUALCOMM Incorporated, San Diego, CA (US)

(72) Inventors: Kumar Pratik, Amsterdam (NL); Arash Behboodi, Amsterdam (NL); Joseph Binamira Soriaga, San Diego, CA (US); Max Welling, Bussum (NL)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/734,524

(22) Filed: May 2, 2022

(65) Prior Publication Data

US 2022/0376801 A1 Nov. 24, 2022

Related U.S. Application Data

(60) Provisional application No. 63/182,719, filed on Apr. 30, 2021.

(51) Int. Cl.
*H04B 17/373* (2015.01)
*H04B 17/391* (2015.01)

(52) U.S. Cl.
CPC ....... *H04B 17/373* (2015.01); *H04B 17/3913* (2015.01)

(58) Field of Classification Search
CPC .................. H04B 17/373; H04B 17/3913
See application file for complete search history.

(56) References Cited

U.S. PATENT DOCUMENTS

2018/0302213 A1\* 10/2018 Bose .................. H04L 25/0212

OTHER PUBLICATIONS

Rangapuram S.S., et al., "Deep State Space Models for Time Series Forecasting", 32nd Conference on Neural Information Processing Systems (NIPS 2018), Montreal, Canada, 2018, pp. 1-10.
Satorras V.G., et al., "Combining Generative and Discriminative Models for Hybrid Inference", 33rd Conference on Neural Information Processing Systems (NeurIPS 2019), Vancouver, Canada, 2019, pp. 1-11.

\* cited by examiner

*Primary Examiner* — Natasha W Cosme
(74) *Attorney, Agent, or Firm* — Seyfarth Shaw LLP

(57) ABSTRACT

A processor-implemented method is presented. The method includes receiving an input sequence comprising a group of channel dynamics observations for a wireless communication channel. Each channel dynamics observation may correspond to a timing of a group of timings. The method also includes determining, via a recurrent neural network (RNN), a residual at each of the group of timings based on the group of channel dynamics observations. The method further includes updating Kalman filter (KF) parameters based on the residual and estimating, via the KF, a channel state based on the updated KF parameters.

28 Claims, 8 Drawing Sheets

HYPERNETWORK KALMAN FILTER FOR CHANNEL ESTIMATION AND TRACKING

CROSS-REFERENCE TO RELATED APPLICATION

The present application claims the benefit of U.S. Provisional Patent Application No. 63/182,719, filed on Apr. 30, 2021, and titled "HYPERNETWORK KALMAN FILTER FOR CHANNEL ESTIMATION AND TRACKING," the disclosure of which is expressly incorporated by reference in its entirety.

BACKGROUND

Field

Aspects of the present disclosure generally relate to wireless communications, and more particularly to techniques and apparatuses for channel estimation and tracking.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP). Narrowband (NB)-Internet of things (IoT) and enhanced machine-type communications (eMTC) are a set of enhancements to LTE for machine type communications.

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, an evolved Node B (eNB), a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

Wireless communication systems may determine channel dynamics by tracking one or more channels, such as time-varying channels. The channel dynamics may be used to improve channel estimation quality. The channel dynamics may be determined based on a Doppler frequency. In some examples, a Kalman filter (KF) or a recurrent neural network (RNN) may be used for channel tracking.

SUMMARY

In one aspect of the present disclosure, a method for channel estimation by a communication device includes receiving an input sequence comprising a group of channel dynamics observations for a wireless communication channel, each channel dynamics observation corresponding to a timing of a group of timings. The method further includes determining, via a recurrent neural network (RNN), a residual at each of the group of timings based on the group of channel dynamics observations. The method still further includes updating Kalman filter (KF) parameters based on the residual. The method also includes estimating, via the KF, a channel state based on the updated KF parameters.

Another aspect of the present disclosure is directed to an apparatus including means for receiving an input sequence comprising a group of channel dynamics observations for a wireless communication channel, each channel dynamics observation corresponding to a timing of a group of timings. The apparatus further includes means for determining, via an RNN, a residual at each of the group of timings based on the group of channel dynamics observations. The apparatus still further includes means for updating KF parameters based on the residual. The apparatus also includes means for estimating, via the KF, a channel state based on the updated KF parameters.

In another aspect of the present disclosure, a non-transitory computer-readable medium with non-transitory program code recorded thereon is disclosed. The program code is executed by a processor and includes program code to receive an input sequence comprising a group of channel dynamics observations for a wireless communication channel, each channel dynamics observation corresponding to a timing of a group of timings. The program code further includes program code to determine, via an RNN, a residual at each of the group of timings based on the group of channel dynamics observations. The program code still further includes program code to update KF parameters based on the residual. The program code also includes program code to estimate, via the KF, a channel state based on the updated KF parameters.

Another aspect of the present disclosure is directed to an apparatus having a processor, and a memory coupled with the processor and storing instructions operable, when executed by the processor, to cause the apparatus to receive an input sequence comprising a group of channel dynamics observations for a wireless communication channel, each channel dynamics observation corresponding to a timing of a group of timings. Execution of the instructions further cause the apparatus to determine, via an RNN, a residual at each of the group of timings based on the group of channel dynamics observations. Execution of the instructions also cause the apparatus to update KF parameters based on the residual. Execution of the instructions still further cause the apparatus to estimate, via the KF, a channel state based on the updated KF parameters.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
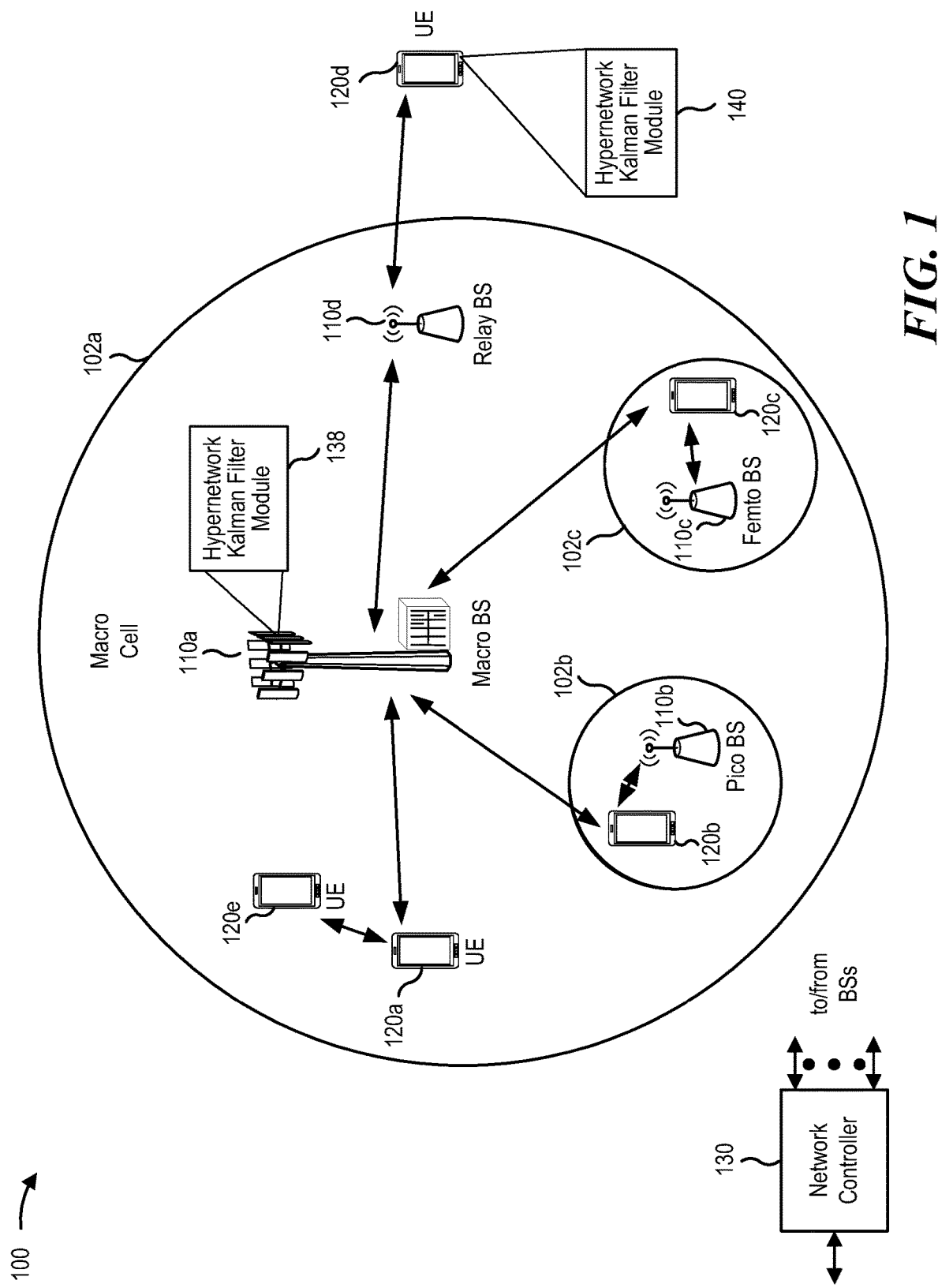
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

Wireless communication systems may determine channel dynamics by tracking one or more channels, such as time-varying channels. The channel dynamics may be used to improve channel estimation quality. The channel dynamics may be determined based on a Doppler frequency. In some examples, a Kalman filter (KF) is used for the channel tracking when the Doppler frequency is known. An autoregressive (AR) model may be assumed for transition dynamics, and the parameters may be selected either based on a Doppler dependent model, such as Jakes model, or by fitting the parameters to the data.

The Kalman filter may be a desirable choice for channel tracking when the transition dynamics, observation model, and noise statistics follow a linear Gaussian assumption. In such cases, the Kalman filter may adapt to missing observations and is robust to noise variation. That is, the Kalman filter may provide estimates of unknown variables given measurements observed over time. Kalman filter-based tracking of communication channels may involve a determination of channel dynamics (e.g., Doppler estimation) and a selection of Kalman filter parameters. Unfortunately, this process involves maintaining a bank of Kalman filters offline, which is cumbersome and reduces practical application. Moreover, an incorrect Kalman filter may be chosen based on an erroneous estimate of channel dynamics. Therefore, the process may be prone to error propagation.

Some wireless communication systems use a recurrent neural network (RNN) for channel tracking. RNNs are a class of neural networks, which include a cyclical connection between nodes or units of the network. The cyclical connection creates an internal state that may serve as a memory that enables recurrent neural networks to model dynamical systems and/or sequential data. Additionally, recurrent neural networks may handle vanishing gradients. Thus, recurrent neural networks may improve the modeling of data sequences. Consequently, recurrent neural networks may improve the modeling of the temporal structure of sequential data, such as audio, video, or a wireless communication propagation signal. In some cases, the performance of an RNN may degrade when processing data deviates from training data. Therefore, the performance of the RNN may degrade when tracking a channel with unknown and varying dynamics.

It may be desirable to improve a process for tracking channels with unknown and varying dynamics. Various aspects of the present disclosure are directed to a hybrid model that is based on a Kalman filter. The hybrid model may be an example of a hypernetwork Kalman filter (HKF). The HKF may track channels with unknown and varying dynamics. In some implementations, at each time step, a neural network updates the parameters of the Kalman filter based on a latent representation of a past sequence. Kalman equations may be used for channel prediction and tracking. Additionally, instead of keeping a bank of Kalman filters for different scenarios, the HKF dynamically adapts itself to different channel dynamics. The HKF may be used for tracking a channel over a range of Doppler values. In contrast to some conventional neural network models, such as a long-short term memory (LSTM) model, the HKF may generalize to an unknown Doppler, unknown signal to noise ratio (SNR) values, and/or unknown pilot patterns.

FIG. 1 is a diagram illustrating an example of a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B, an access point, a transmit and receive point (TRP), a network node, a network entity, and/or the like. A BS can be implemented as an aggregated base station, as a disaggregated base station, an integrated access and backhaul (IAB) node, a relay node, a sidelink node, etc. The BS can be implemented in an aggregated or monolithic base station architecture, or alternatively, in a disaggregated base station architecture, and may include one or more of a central unit (CU), a distributed unit (DU), a radio unit (RU), a near-real time (near-RT) RAN intelligent controller (RIC), or a non-real time (non-RT) RIC. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB," "base station," "NR BS," "gNB," "AP," "node B," "5G NB," "TRP," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

The UEs 120 may include a hypernetwork Kalman filter (HKF) module 140. For brevity, only one UE 120d is shown as including the HKF module 140. The HKF module 140 may be configured to perform functions associated with the process 800 described with reference to FIG. 8.

The base stations 110 may include an HKF module 138. For brevity, only one base station 110a is shown as including the HKF module 138. The HKF module 138 may be configured to perform functions associated with the process 800 described with reference to FIG. 8.

As indicated above, FIG. 1 is provided merely as an example. Other examples may differ from what is described with regard to FIG. 1.

Figure 2:
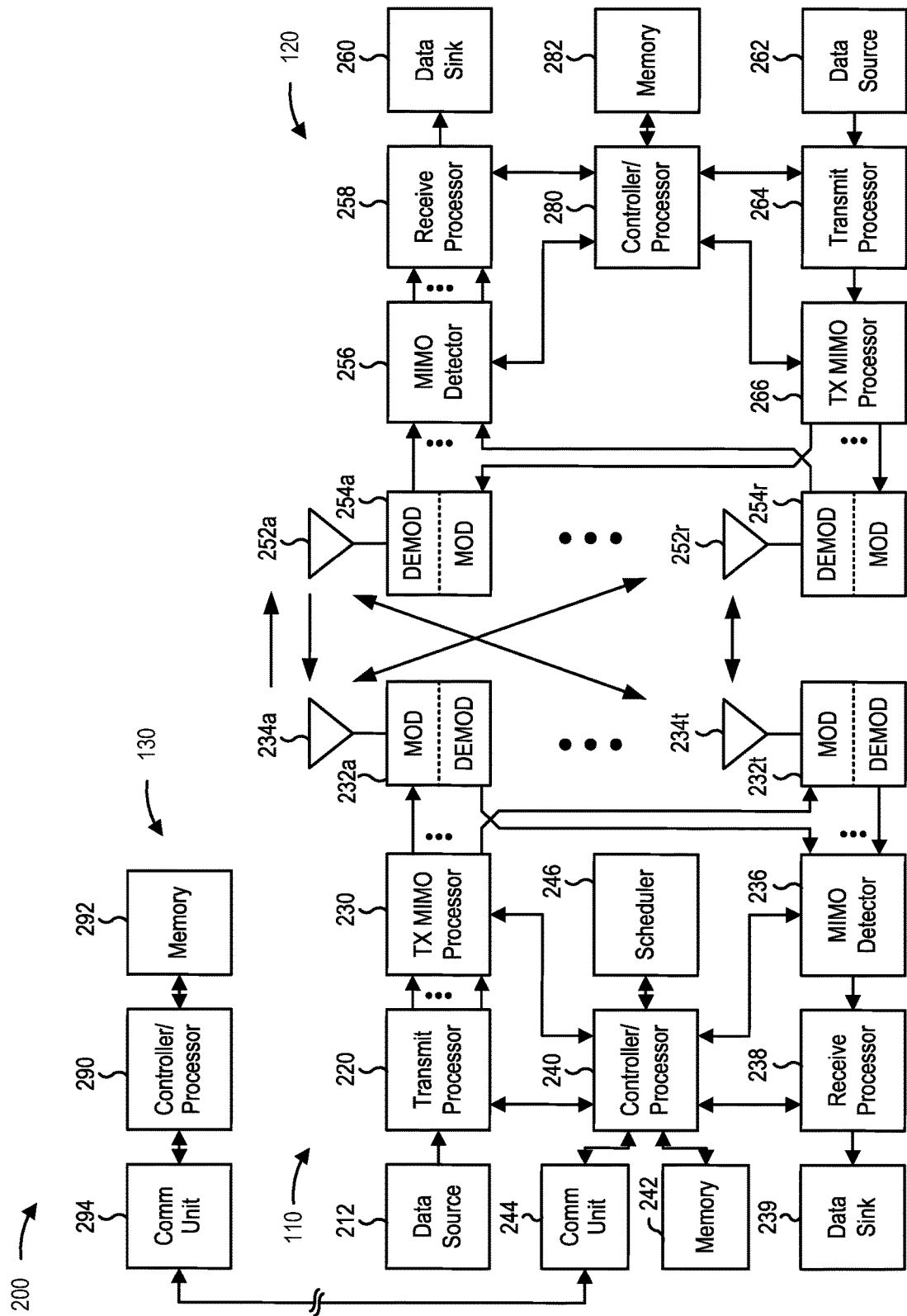
FIG. 2 is a block diagram conceptually illustrating an example of a base station in communication with a user equipment (UE) in a wireless communications network, in accordance with various aspects of the present disclosure.

FIG. 2 shows a block diagram of an exemplary design 200 of the base station 110 and UE 120, which may be one of the base stations and one of the UEs in FIG. 1. The base station 110 may be equipped with T antennas 234a through 234t, and UE 120 may be equipped with R antennas 252a through 252r, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At the UE 120, antennas 252a through 252r may receive the downlink signals from the base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (e.g., for discrete Fourier transform spread OFDM (DFT-s-OFDM), CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with machine learning for tracking and estimating a channel as described in more detail elsewhere. For example, the controller/processor 240 of the base station 110, the controller/processor 280 of the UE 120, and/or any other component(s) of FIG. 2 may perform or direct operations of, for example, the processes of FIG. 8 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving an input sequence comprising a plurality of channel dynamics observations for a wireless communication channel, each channel dynamics observation corresponding to a timing of a plurality of timings; means for determining a residual at each of the plurality of timings based on the plurality of channel dynamics observations; means for updating Kalman filter (KF) parameters based on the residual; and means for estimating a channel state based on the updated KF parameters. As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (such as a Node B (NB), an evolved NB (eNB), an NR BS, 5G NB, an access point (AP), a transmit and receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, e.g., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
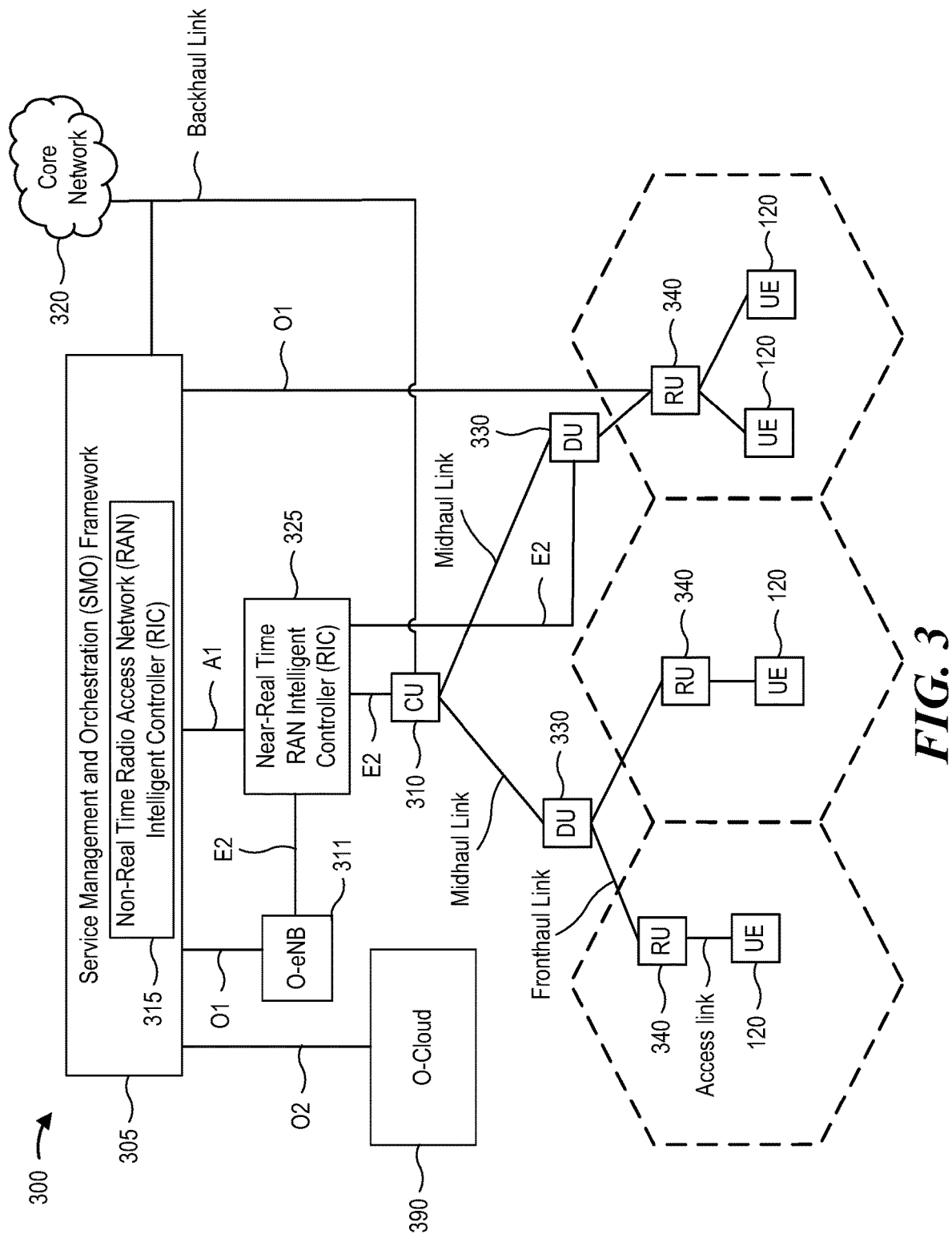
FIG. 3 is a block diagram illustrating an example disaggregated base station architecture, in accordance with various aspects of the present disclosure.

FIG. 3 shows a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (such as a near-real time (near-RT) RAN intelligent controller (RIC) 325 via an E2 link, or a non-real time (non-RT) RIC 315 associated with a service management and orchestration (SMO) framework 305, or both). A CU 310 may communicate with one or more distributed units (DUs) 330 via respective midhaul links, such as an F1 interface. The DUs 330 may communicate with one or more radio units (RUs) 340 via respective fronthaul links. The RUs 340 may communicate with respective UEs 120 via one or more radio frequency (RF) access links. In some implementations, the UE 120 may be simultaneously served by multiple RUs 340.

Each of the units (e.g., the CUs 310, the DUs 330, the RUs 340, as well as the near-RT RICs 325, the non-RT RICs 315, and the SMO framework 305) may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., central unit-user plane (CU-UP)), control plane functionality (e.g., central unit-control plane (CU-CP)), or a combination thereof. In some implementations, the CU 310 can be logically split into one or more CU-UP units and one or more CU-CP units. The CU-UP unit can communicate bi-directionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the Third Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 340 can be implemented to handle over the air (OTA) communication with one or more UEs 120. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-cloud) 390) to perform network element life cycle management (such as to instantiate virtualized network elements) via a cloud computing platform interface (such as an O2 interface). Such virtualized network elements can include, but are not limited to, CUs 310, DUs 330, RUs 340, and near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the near-RT RIC 325. The non-RT RIC 315 may be coupled to or communicate with (such as via an A1 interface) the near-RT RIC 325. The near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as the O-eNB 311, with the near-RT RIC 325.

In some implementations, to generate AI/ML models to be deployed in the near-RT RIC 325, the non-RT RIC 315 may receive parameters or external enrichment information from external servers. Such information may be utilized by the near-RT RIC 325 and may be received at the SMO Framework 305 or the non-RT RIC 315 from non-network data sources or from network functions. In some examples, the Non-RT RIC 315 or the near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via O1) or via creation of RAN management policies (such as A1 policies).

Figure 4:
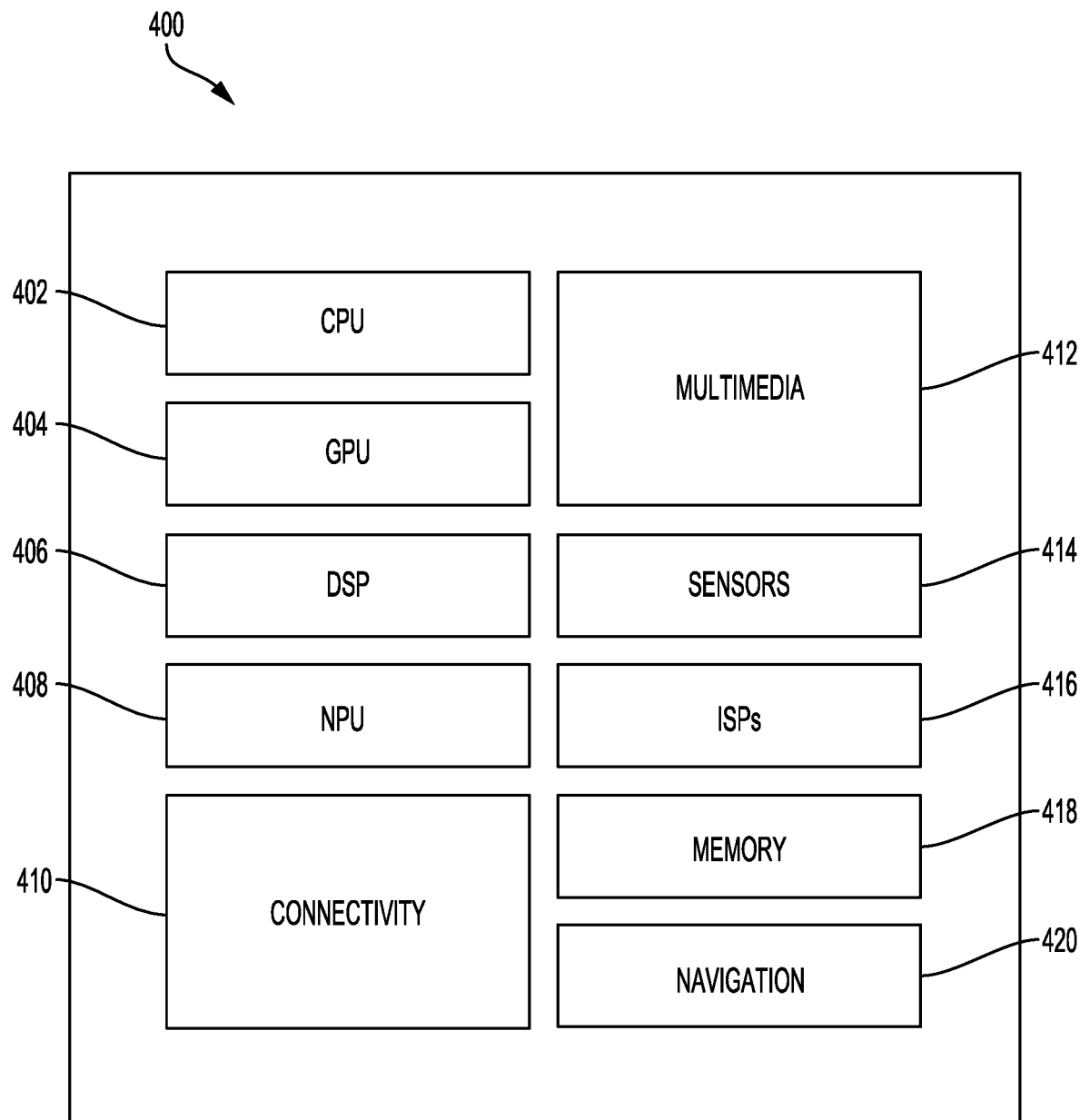
FIG. 4 illustrates an example implementation of designing a neural network using a system-on-a-chip (SOC), including a general-purpose processor, in accordance with certain aspects of the present disclosure.

FIG. 4 illustrates an example implementation of a system-on-a-chip (SOC) 400, which may include a central processing unit (CPU) 402 or a multi-core CPU configured for generating gradients for neural network training, in accordance with certain aspects of the present disclosure. The SOC 400 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 408, in a memory block associated with a CPU 402, in a memory block associated with a graphics processing unit (GPU) 404, in a memory block associated with a digital signal processor (DSP) 406, in a memory block 418, or may be distributed across multiple blocks. Instructions executed at the CPU 402 may be loaded from a program memory associated with the CPU 402 or may be loaded from a memory block 418.

The SOC 400 may also include additional processing blocks tailored to specific functions, such as a GPU 404, a DSP 406, a connectivity block 410, which may include fifth generation (5G) connectivity, fourth generation long term evolution (4G LTE) connectivity, Wi-Fi connectivity, USB connectivity, Bluetooth connectivity, and the like, and a multimedia processor 412 that may, for example, detect and recognize gestures. In one implementation, the NPU is implemented in the CPU, DSP, and/or GPU. The SOC 400 may also include a sensor processor 414, image signal processors (ISPs) 416, and/or navigation module 420, which may include a global positioning system.

The SOC 400 may be based on an ARM instruction set. In an aspect of the present disclosure, the instructions loaded into the general-purpose processor 402 may comprise code to perform the functions associated with the process 800 described with reference to FIG. 8.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human-engineered features, perhaps in combination with a shallow classifier. A shallow classifier may be a two-class linear classifier, for example, in which a weighted sum of the feature vector components may be compared with a threshold to predict to which class the input belongs. Human-engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still, higher layers may learn to recognize common visual objects or spoken phrases.

Deep learning architectures may perform well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 5:
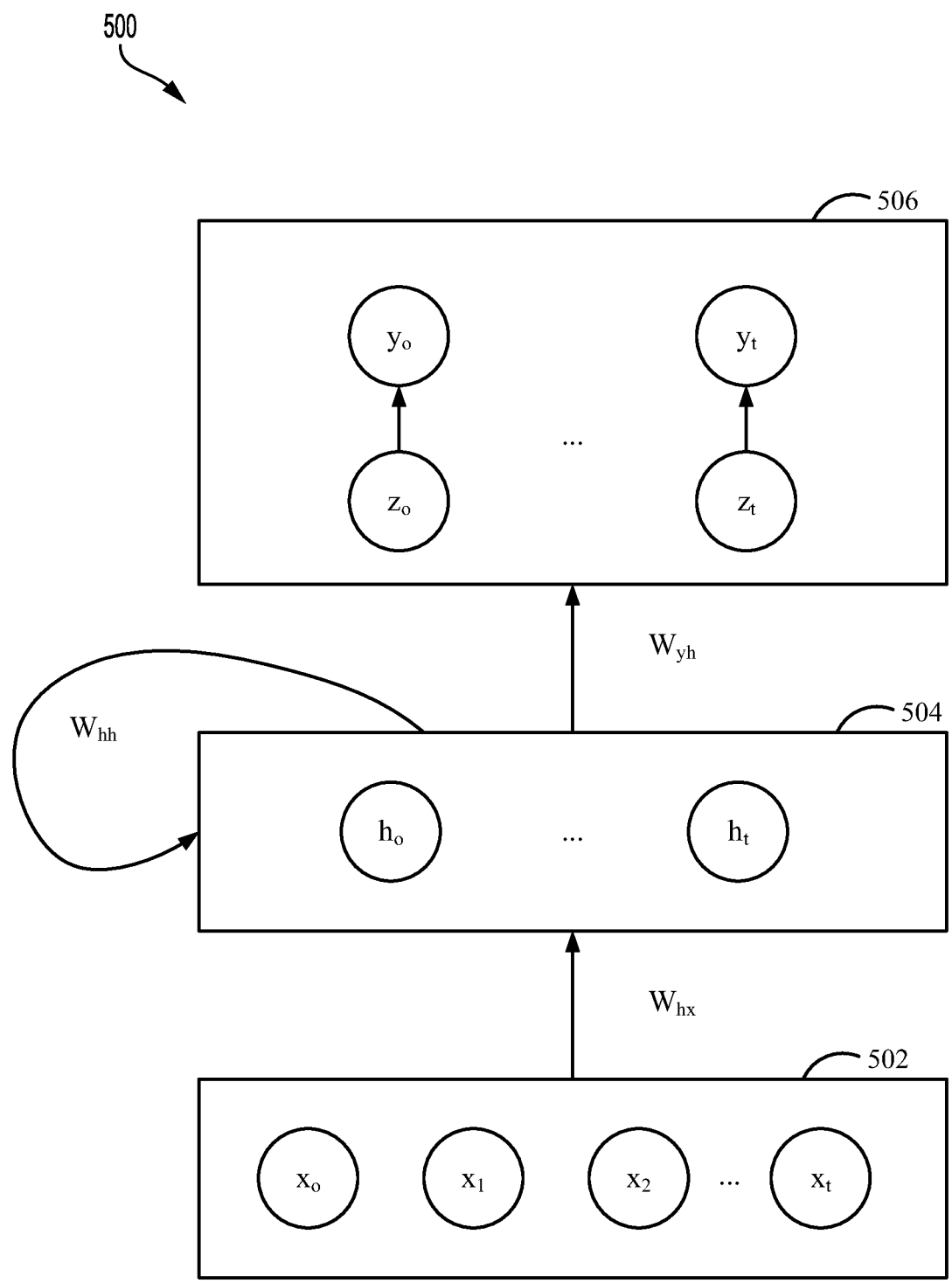
FIG. 5 is a block diagram illustrating an example recurrent neural network (RNN), in accordance with various aspects of the present disclosure.

FIG. 5 is a block diagram illustrating an example of a recurrent neural network (RNN) 500. The recurrent neural network 500 includes an input layer 502, a hidden layer 504 with recurrent connections, and an output layer 506. Given an input sequence X with multiple input vectors $x_t$ (e.g., $X=\{x_0, x_1, x_2 \ldots x_t\}$), the recurrent neural network 500 will predict a classification label $y_t$ for each output vector $z_T$ of an output sequence Z (e.g., $Z=\{z_0 \ldots z_t\}$). As shown in FIG. 5, a hidden layer 504 with M units (e.g., $h_0 \ldots h_t$) is between the input layer 502 and the output layer 506. The M units of the hidden layer 504 store information on the previous values (t<t) of the input sequence X. The M units may be computational nodes (e.g., artificial neurons). In some configurations, the recurrent neural network 500 receives an input $x_T$ and generates a classification label $y_t$ of the output $z_T$ by iterating the equations:

$$s_t = W_{hx}x_t + W_{hh}h_{t-1} + b_h \qquad (1)$$

$$h_t = f(s_t) \qquad (2)$$

$$o_t = W_{yh}h_t + b_y \qquad (3)$$

$$y_t = g(o_t) \qquad (4)$$

In Equations 1 and 3, the variables $W_{hx}$, $W_{hh}$, and $W_{yh}$ represent the weight matrices, and variables $b_h$ and $b_y$ represents the biases. In Equations 2 and 4, $s_t$ and $o_t$ are inputs to the hidden layer 504 and the output layer 506, respectively, and $f$ and $g$ are nonlinear functions. The function $f$ may comprise a rectifier linear unit (RELU) and, in some aspects, the function $g$ may comprise a linear function or a softmax function. In addition, the nodes of the hidden layer 504 are initialized to a fixed bias bi such that at t=0, $h_o$=bi. In some aspects, bi may be set to zero (e.g., bi=0). The objective function, $C(\theta)$, for a recurrent neural network with a single training pair (x,y) is defined as $C(\theta) = \Sigma_t L_t(z, y(\theta))$, where $\theta$ represents the set of parameters (e.g., weights and biases) in the recurrent neural network. For regression problems, $L_t = \|(z_t - y_t)^2\|$ and for multi-class classification problems, $L_t = -\Sigma_j z_{tj} \log(y_{tj})$.

As discussed, a wireless communication system may track one or more channels, such as time-varying channels, to determine channel dynamics. Conventional wireless communication systems may use a Kalman filter for channel tracking when the underlying dynamics of a channel are known. In such examples, the Kalman parameters can be matched to the known channel dynamics. However, the use of the Kalman filter may lead to errors in a multi-Doppler scenario where the Doppler frequency is not known. Aspects of the present disclosure are directed to a hybrid model where the Kalman updates are modeled as message passing functions that may be learned using one or more neural networks. Conventional Kalman updates are not modeled by a neural network. The hybrid model may be referred to as a hypernetwork Kalman filter (HKF).

The underlying stochastic process for tracking a wireless communication channel is a complex function of various external factors such as environmental obstructions, reflections, and the relative velocity and alignment between the transmitter and the receiver. These external factors may lead to unknown or varying channel observations. As discussed, the HKF may estimate a channel, such as a wireless channel, when observations, such as Doppler observations, are unknown or when observations vary over time. As an example, a wireless channel may be observed by receiving and measuring a periodic pilot signal. In this example, observations are unavailable between pilot signal transmissions. Additionally, the pilot signal observations may vary over time.

Figure 6:
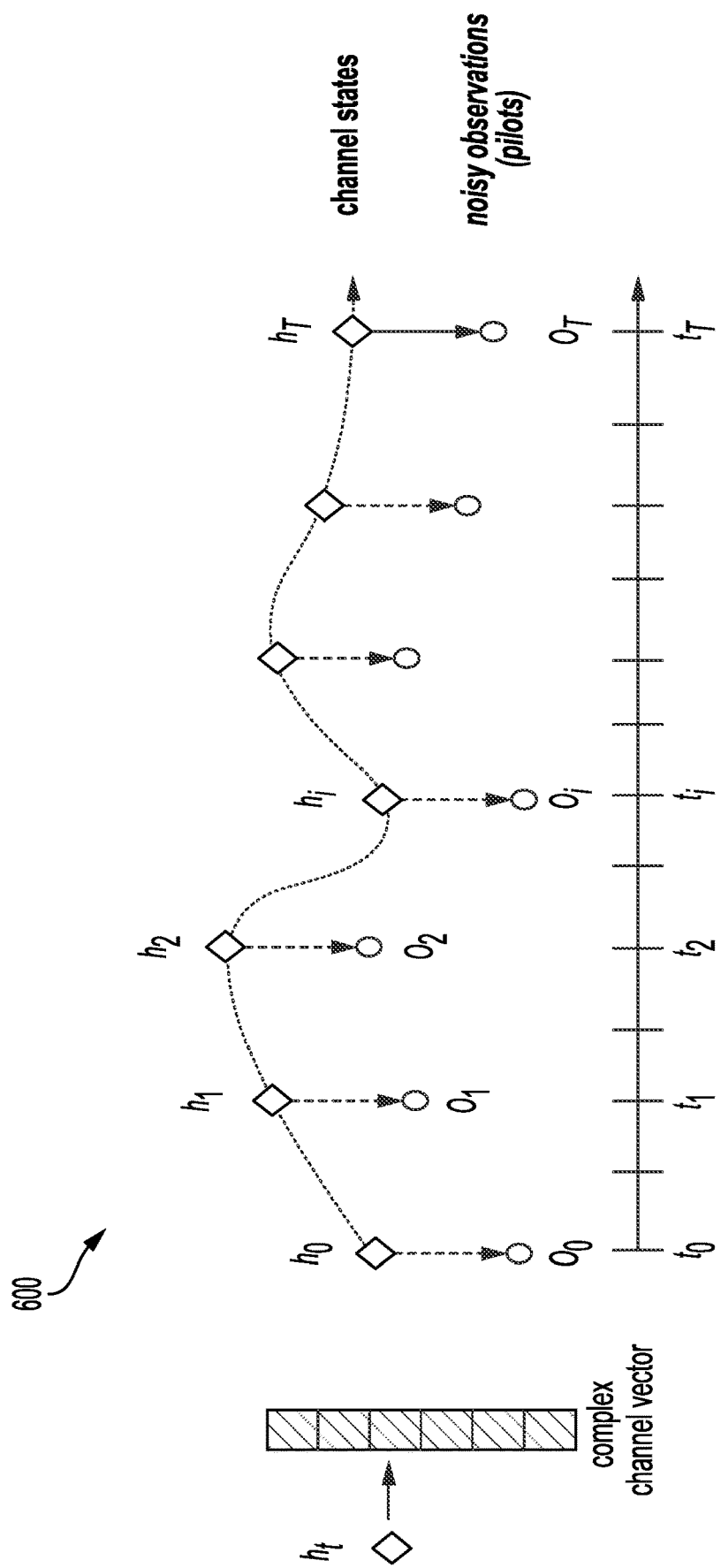
FIG. 6 is a timeline illustrating an example of wireless channel observations, in accordance with various aspects of the present disclosure.

An example of wireless channel observations is provided in FIG. 6, which is a timeline 600 illustrating an example of wireless channel observations, in accordance with various aspects of the present disclosure. In the example of FIG. 6, the wireless channel corresponds to a communication channel established between a receiver (not shown in FIG. 6) and a transmitter (not shown in FIG. 6). The receiver may be an example of a UE 120 and the transmitter may be an example of a base station 110, as described with reference to FIGS. 1 and 2. The wireless channel may be an example of an orthogonal frequency division multiplex (OFDM) channel with N sub-carriers. The communication between the transmitter and the receiver may span T consecutive OFDM symbols. At the OFDM symbol at each time step $t_i$, a source signal $x_i \in \mathbb{C}^N$ is modulated at the transmitter over N sub-carriers using an inverse-fast Fourier transformation (IFFT) operation and is transmitted after cyclic prefix (CP) addition. The source signal $x_i$ represents the source signal x at the $i^{th}$ time step. In some examples, the source signal $x_i$ may also be represented as $x_{t_i}$. The variable $\mathbb{C}^N$ represents a complex coordinate space of N dimension, such that $x_{t_i}$ is a N-dimensional complex valued vector. The CP may be long enough to remove inter-symbol interference (ISI). However, as shown in FIG. 6, the wireless channel may change in time with a Doppler frequency $f_d$. That is, as shown in the example of FIG. 6, the channel observations ($o_0$ to $o_T$) and channel states ($h_0$ to $h_T$) vary over a period of time ($t_0$ to $t_T$).

In the example of FIG. 6, the channel may be estimated by measuring known pilot OFDM symbols (e.g., pilots) at each time step $t_i$. The pilots may be transmitted once every $T_p$ OFDM symbols, where p represents a pilot frequency. In some examples, a noisy channel may be observed via a pilot transmission at a regular interval. The time period of the pilot (e.g., pilot frequency) may be given by $T_p$. The receiver may measure each pilot at each discrete time step $t_i$ and associate a channel observation $o_t$ with the measured pilot. A channel state $h_t$ (e.g., ground truth channel) at each time step $t_i$ may be denoted as $h_t \in \mathbb{C}^N$. Each channel observation $o_t$ may be examples of the channel state $h_t$ with added noise $r_t$ (e.g., $o_t = h_t + r_t$), such that each channel observation $o_t$ may be referred to as a noisy observation. The channel observation $o_t$ may also be referred to as the estimated channel based solely on an observed pilot.

Aspects of the present disclosure estimate and track the channel between pilot transmissions and use past information to improve the channel that is estimated based on the pilots. The final estimated channel at time t is denoted by $\hat{h}_t$. An error between the final estimate channel $\hat{h}_t$ and the channel state $h_t$ may be determined using a normalized mean square error (NMSE), where:

$$NMSE(t) = \frac{\|\hat{h}_t - h_t\|_2^2}{\|h_t\|_2^2} \quad (5)$$

In some implementations, the channel may be tracked in a time domain. Additionally, aspects of the present disclosure may track single-input single-output (SISO) channels or multiple-input multiple-output (MIMO) channels.

As discussed, a Kalman filter may be used to track a wireless channel. In some examples, the Kalman filter may be implemented as a hidden Markov model (HMM). In such examples, the true channel state for discrete time step t may be represented by $h_t$ and may be expressed as:

$$h_t = A_1 h_{t-1} + w_t, \quad (5)$$

where a matrix $A_1$ is a set of channels parameters, and parameters $w_t$ and represents the process noise. Whenever pilot symbols are transmitted, a noisy observation $o_t$ of, or a part of, the channel state $h_t$ may be expressed as:

$$o_t = Bh_t + v_t, \quad (6)$$

where a matrix B represents a set of Kalman filter parameters and $v_t$ represents the observation noise.

In some aspects, the Kalman filter may be an autoregressive (AR) Kalman filter. In such aspects, AR models may be used for the transition dynamics of the channel state $h_t$. In some examples, a second order AR (AR2) Kalman equation may be given by:

$$\begin{pmatrix} h_t \\ h_{t-1} \end{pmatrix} = F_t \begin{pmatrix} h_{t-1} \\ h_{t-2} \end{pmatrix} + \begin{pmatrix} q_t \\ 0 \end{pmatrix}, \quad (7)$$

$$\begin{pmatrix} o_t \\ o_{t-1} \end{pmatrix} = H_t \begin{pmatrix} h_t \\ h_{t-1} \end{pmatrix} + \begin{pmatrix} r_t \\ r_{t-1} \end{pmatrix}. \quad (8)$$

In Equation 7, a matrix $F_t$ models transition dynamics. In Equation 8, a channel state matrix $H_t$ models the observation matrix. The matrix $F_t$ may be given by:

$$F_t := \begin{pmatrix} F_1^t & F_2^t \\ I & 0 \end{pmatrix}, \quad (9)$$

and the matrix $H_t$ may be given by:

$$H_t := I. \quad (10)$$

Furthermore, in Equation 7, the variable $q_t$ represents a vector for the process noise with a covariance matrix $Q_t$. The covariance matrix of a noise vector $$\begin{pmatrix} q_t \\ 0 \end{pmatrix}$$

may be denoted as $\tilde{Q}_t$. A covariance matrix of a total observation noise $$\begin{pmatrix} r_t \\ r_{t-1} \end{pmatrix}$$

may be denoted as $\tilde{R}_t$.

In some implementations, Kalman updates may be determined based on Equations 7 and 8. The Kalman updates may be determined based on two scenarios. In the first scenario, observations are not present. In the second scenario, observations $o_t$ are present. In both scenarios, at time t, the Kalman filter has access to previous channel estimates $\hat{h}_{t-1}$ and $\hat{h}_{t-2|t-1}$ (e.g., the estimate of $\hat{h}_{t-2}$ at time t−1), and the covariance matrix of the estimate $$\begin{pmatrix} \hat{h}_{t-1} \\ \hat{h}_{t-2|t-1} \end{pmatrix}$$

denoted by $\Sigma_{t-1|t-1}$. When observations are not present (e.g., a pilot is unavailable at time t), the estimated channel may be equal to:

$$\begin{pmatrix} \hat{h}_t \\ \hat{h}_{t-1|t} \end{pmatrix} = F_t \begin{pmatrix} \hat{h}_{t-1} \\ \hat{h}_{t-2|t-1} \end{pmatrix}. \quad (11)$$

In the AR2 model, $\hat{h}_{t-1|t}$ is equal to $\hat{h}_{t-1}$. When observations $o_t$ are available, the estimate channel $\hat{h}_t$ may be given recursively by Kalman updates:

$$\begin{pmatrix} \hat{h}_t \\ \hat{h}_{t-1|t} \end{pmatrix} = F_t \begin{pmatrix} \hat{h}_{t-1} \\ \hat{h}_{t-2|t-1} \end{pmatrix} + K_t y_t, \quad (12)$$

where the variables $K_t$ and $y_t$ represent a Kalman gain and a Kalman innovation, respectively. The Kalman innovation is given by:

$$y_t = \begin{pmatrix} o_t \\ o_{t-1} \end{pmatrix} - H_t F_t \begin{pmatrix} \hat{h}_{t-1} \\ \hat{h}_{t-2|t-1} \end{pmatrix}. \quad (13)$$

The Kalman gain may be recursively determined from the estimated covariance matrix of a last time step denoted by $\Sigma_{t-1|t-1}$:

$$K_t = \Sigma_{t-1|t-1} H_t^H (H_t \Sigma_{t|t-1} H_t^H + \tilde{R}_t)^{-1}, \quad (14)$$

where $\Sigma_{t|t-1} = F_t \Sigma_{t-1|t-1} F_t^H + \tilde{Q}_t$.

The estimated covariance matrix at time t, $\Sigma_{t|t}$ is given by $\Sigma_{t|t-1}$ if a new observation is not available. Otherwise, $\Sigma_{t|t}$ is given by $(I-K_t H_t)\Sigma_{t|t-1}$. For AR2 models, it may be assumed that $H_t = I$. Equations 7-12 may be recursively determined with known values for $(F_1^t, F_2^t, Q_t, R_t)$ for all values of time t.

In some examples, a ground truth channel may be known at training time. Therefore, Kalman parameters may be obtained based on a linear regression. For a multi-Doppler scenario, Kalman filter parameters may be selected according to an actual Doppler. In such scenarios, a group (e.g., bank) of Kalman filters and an additional Doppler estimation unit may be specified. Various aspects of the present disclosure assume that a Doppler range is divided into finite bins with one Kalman filter per bin. The Doppler frequency may be known to select a correct bin. This process may be referred to as a binned Kalman filter (BKF).

A data driven approach may avoid the overhead of explicit Doppler estimation and maintenance of a group of Kalman filters. As an alternative to Kalman filters, some aspects may use an RNN for prediction. The RNN may be trained over the full range of Doppler values. Therefore, a single model can replace a group of Kalman filters without any need for explicit Doppler estimation. To account for missing observations, the RNN may predict, at each time step, a current channel estimate $\hat{h}_t$ and a next observation $\hat{o}_{t+1}$. In a case of a missing observation, the RNN can take this synthetic estimated observation $\hat{o}_{t+1}$ as an input. The real observation $o_{t+1}$ may be used whenever it is available. In some aspects, a variable $\tilde{o}_t$ may represent observations, such that:

$$\tilde{o}_t = \begin{cases} o_t & \text{observation is present} \\ \hat{o}_t & \text{observation is missing} \end{cases}. \quad (15)$$

In some examples, recurrent iterations of the RNN are given by:

$$z_t = \text{RNN}(z_{t-1}, \hat{h}_{t-1}, \tilde{o}_t) \quad (16)$$

$$\hat{h}_t, \hat{o}_{t+1} = \text{MLP}(z_t), \quad (17)$$

where, the variable $z_t$ represent a state variable of the RNN, and MLP refers to a multi-layer perceptron.

As discussed, various aspects of the present disclosure use an HKF to track a channel. The HKF complements the flexibility of RNNs to learn to extract the dynamics from the data with the robustness and interpretability of the Kalman filter. In some examples, the HKF consists of a Kalman filter accompanied by an RNN to augment its capabilities. Specifically, the HKF extends the class of evolutionary processes that a Kalman filter can model by augmenting the Kalman filter with the RNN. The HKF retains the interpretability of a Kalman filter and at the same time, circumvents the limitations posed by a standalone Kalman filter by incorporating the RNN with parameters learned from the training data. The prediction is still performed by the Kalman filter, thereby enjoying robustness and generalization of the Kalman filter. However, Kalman parameters are updated at each time using an RNN based on the process history.

Figure 7:
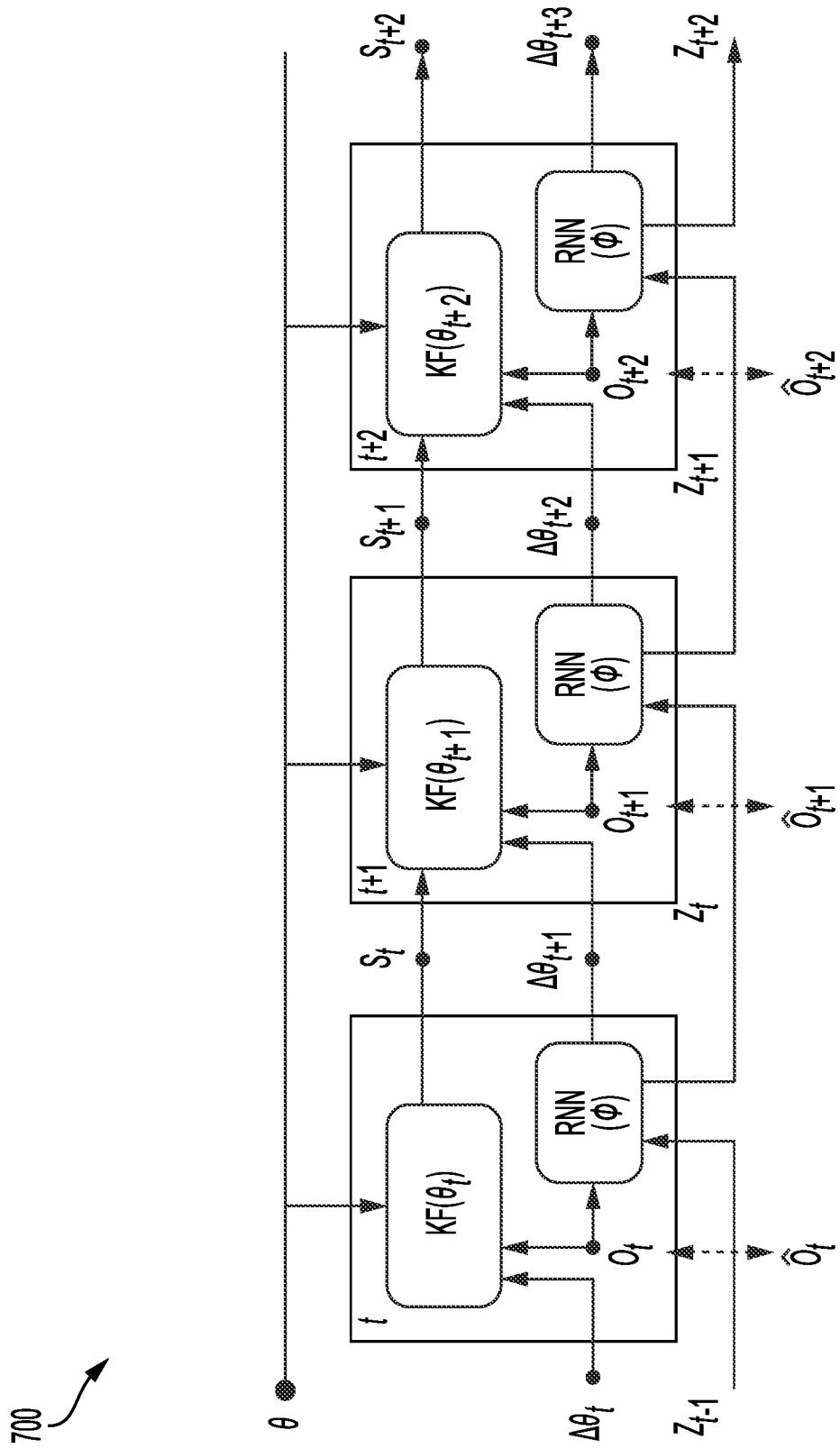
FIG. 7 is a block diagram of an example of an architecture of a hypernetwork Kalman filter (HKF) for channel estimation and tracking, in accordance with various aspects of the present disclosure.

FIG. 7 is a block diagram of an example of an architecture 700 of an HKF for channel estimation and tracking, in accordance with various aspects of the present disclosure. The example of FIG. 7 illustrates three iterations of the HKF at different time steps, specifically time steps t, t+1, and t+2. As shown in the example of FIG. 7, the architecture 700 of the HKF includes a Kalman filter (shown as KF) and an RNN. The Kalman filter of the HKF may be parameterized by the parameter set $\theta_t = (F_1^t, F_2^t, H_t, Q_t, R_t)$. The parameters $\theta_t$ may be updated at each time t by the RNN associated with the HKF. In some examples, the parameters $\theta_t$ may be referred to as a base set of analytically computed Kalman filter parameters, a base set of Kalman filter parameters, or Kalman filter parameters.

In some examples, the Kalman filter and the RNN of the architecture 700 receive a sequence of observations $o_t$ of propagation channel dynamics as an input. The input may, for instance, include a noisy observation of an orthogonal frequency-multiplexing (OFDM) symbol. The architecture 700 may also receive a base set of analytically computed Kalman filter parameters $\theta$. The base set of analytically computed Kalman filter parameters $\theta$ may be stationary or fixed in time. In some aspects, the base set of Kalman filter parameters $\theta$ may be averaged time stationary Kalman filter parameters. For example, in some aspects, the base set of Kalman filter parameters $\theta$ may be the minimum mean square error (MMSE) of a training data set of Kalman filter parameters. In some examples, a process noise parameter Q of the base set of Kalman filter parameters may be determined during training.

In the example of FIG. 7, the variable $\theta_t$ represents final Kalman filter parameters at time step t, $z_t$ represents an RNN state variable (e.g., hidden state variable) at time step t, $\phi$ represents trainable parameters of the HKF, and $s_t$ represents a hidden state of the Kalman filter at time step t. In some examples, at time step t, the RNN receives the current observation $o_t$ of the propagation channel dynamics and the prior hidden state $z_{t-1}$. The RNN may then model temporal variations of the Kalman filter parameters. That is, at each time step t, the RNN generates a residual $\Delta\theta_{t+1}$ that may be used to determine the final Kalman filter parameters $\theta_{t+1}$ for the next time step t+1. That is, the residual may be added to the Kalman filter parameters to generate a final Kalman filter parameter at each time step. The RNN may model the Kalman filter parameters in terms of a residual around the base set of Kalman filter parameters $\theta$. In some examples, the RNN may model the Kalman filter parameters in terms of a residual a mean set of the filter parameters $\theta$. MMSE estimation may not be used for transition parameters $F^1$ and $F^2$, rather, the transition parameters $F^1$ and $F^2$ may be kept as identity and zero matrices, respectively. For a process noise covariance matrix, Q, MMSE parameter estimation may be specified over the entire dataset. In the example of FIG. 7, the base set of Kalman filter parameters θ may be fixed and the RNN may provide correction terms:

$$z_t = RNN(z_{t-1}, \hat{h}_{t-1}, \hat{o}_t), \Delta\theta_{t+1} = MLP(z_t) \quad (18)$$

$$\theta_{t+1} = \theta + \Delta\theta_{t+1} \quad (19)$$

In Equation 18, a hidden state of the RNN may be projected by single layer MLP (zero hidden layer) to a specified dimension, which may be recast into a Kalman filter parameters domain. Furthermore, as shown in Equation 19, the example architecture 700 may update the Kalman filter parameters base on the residual $\Delta\theta_t$. Accordingly, the updated Kalman filter parameters at time step t ($\theta_t$) may be given by $\theta_t = \theta + \Delta\theta_t$. The Kalman filter may then apply the updated Kalman filter parameters $\theta_t$ to compute a channel estimate (e.g., $S_t$) based on the input. In some aspects, the channel estimate may be a Doppler estimate, for example.

As discussed, at each time step, the HKF may have access to a base set of Kalman filter parameters $\theta = (F_1^t, F_2^t, H, Q, R)$. The RNN may model the correction term for the base set of Kalman filter parameters θ. When the HKF is used for channel tracking, a signal-to-noise ratio (SNR) may be known or estimated. Additionally, some Kalman filter parameters, such as $F_1^t$, $F_2^t$, and Q may vary across different Doppler scenarios. Therefore, the RNN may model a residual for these parameters, such that $\Delta\theta_{t+1} = (\Delta F_1^{t+1}, \Delta F_2^{t+1}, \Delta Q_{t+1})$. In some examples, $F_1$ may be an identity matrix, $F_2$ may be a zero matrix, and Q may be a Kalman filter process covariance matrix averaged across an entire training dataset.

In the case of missing observations, the RNN uses the Kalman filter estimate at time step t (e.g., $\hat{h}_t$). The Kalman filter estimate may be forwarded through the observation process ($H_t$, $R_t$). As such, a synthetic observation $\hat{o}_t$ may be modeled as a Gaussian random vector with a mean value $H_t\hat{h}_t$ and a covariance $R_t$. The synthetic observation $\hat{o}_t$ may be input to the RNN. Reparameterizaion may be used to back propagate through the sampling process, such that:

$$\hat{o}_t = H_t\hat{h}_t + R_t^{1/2}\varepsilon, \varepsilon \sim \mathcal{N}(0, \mathbb{I}_n) \quad (20)$$

In some examples, missing pilot observations may be imputed with synthetic samples. For example, if a pilot transmission is missing at time t, the model may be missing an observation $o_t$, such that the model may not have access to a channel estimate $\hat{h}_t$. Using the observation model or the measurement process of the Kalman filter, aspects of the present disclosure may generate a synthetic sample $\hat{o}_t$ to impute for the missing $o_t$. In Equation 20, $H_t$ represents the measurement matrix or measurement model of the concerned stochastic process. $H_t$ may also be referred to as an observation model of the Kalman filter. The hidden state of the Kalman filter, and the observation are linked by the equation $o_t = H_t h_t + v_t$, where $v_t$ represents the observation noise. To generate a synthetic observation sample $\hat{o}_t$, the estimate of the channel at time t, $\hat{h}_t$, may be forwarded through the observation model $H_t$ of the Kalman filter. That is, as shown in Equation 20, the estimate of the channel $\hat{h}_t$ may be multiplied by the observation model $H_t$ and synthetic noise may be added to the product. In some examples, the forward model is an identity matrix, (e.g., $H_t = I$), therefore, $o_t = h_t + v_t$. In some such examples, an N-dimensional noise vector whose covariance is given by $R_t$ may be sampled and added to the channel estimate $\hat{h}_t$. The sampling procedure may be referred to as reparameterization, where a noise vector is sampled from a standard normal distribution, $\varepsilon \sim \mathcal{N}(0, \mathbb{I}_n)$, and then scaled by the square root of the required covariance, $R_t^{1/2}\varepsilon$. The samples generated by this procedure may have a resulting covariance of $R_t$. In a channel tracking problem, $H_t$ may be set to an identity matrix and $R_t$ may be a diagonal matrix with diagonal elements given by a vector $R_{diag}$. The sampling operation may be simplified to $R_{diag}^{1/2} \odot \varepsilon$. In some examples, an LSTM may be used as the RNN for the HKF.

A loss function to train the HKF is:

$$\mathcal{L}_{HKF(\phi)} = \Sigma_{m=1}^M \Sigma_{t=1}^T MSE(\hat{h}_t(\phi), h_t) \quad (21)$$

Figure 8:
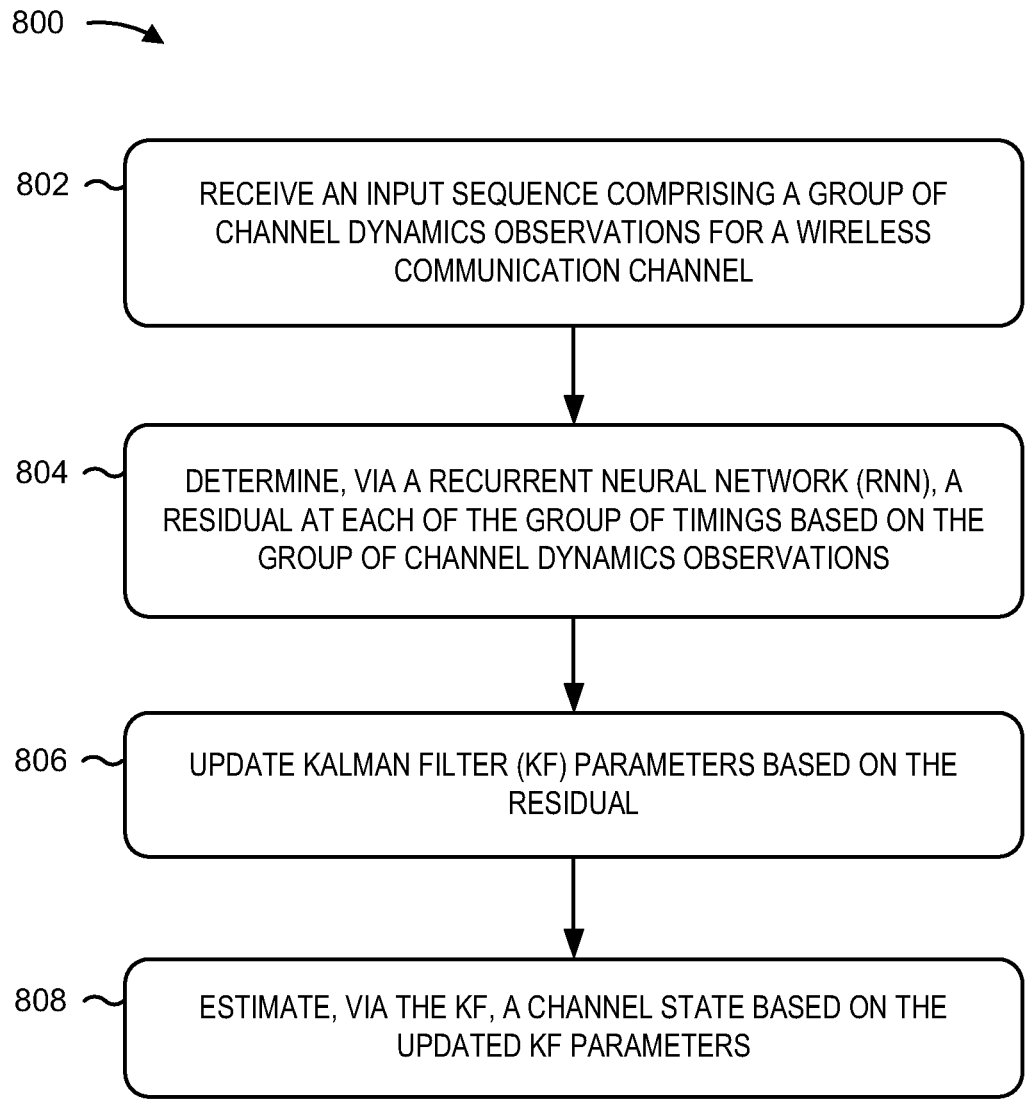
FIG. 8 is a flow diagram illustrating an example process performed, for example, by an HKF, in accordance with various aspects of the present disclosure.

FIG. 8 is a flow diagram illustrating an example process 800 performed, for example, by a communication device, in accordance with various aspects of the present disclosure. The example process 800 is an example of estimating a channel. In some examples, the communication device may be a receiver, such as a UE, or a transmitter, such as a base station. As shown in FIG. 8, the process 800 begins at block 802 by receiving an input sequence comprising a group of channel dynamics observations for a wireless communication channel. Each channel dynamic observation may correspond to a timing of a group of timings. At block 804, the process 800 determines, via a recurrent neural network (RNN), a residual at each of the number of timings based on the group of channel dynamics observations. At block 806, the process 800 updates Kalman filter (KF) parameters based on the residual. At block 808, the process 800 estimates, via the KF, a channel state based on the updated KF parameters.

Implementation examples are described in the following numbered clauses.

Clause 1. A processor-implemented method for channel estimation by a communication device, comprising: receiving an input sequence comprising a group of channel dynamics observations for a wireless communication channel, each channel dynamics observation corresponding to a timing of a group of timings; determining, via a recurrent neural network (RNN), a residual at each of the group of timings based on the group of channel dynamics observations; updating Kalman filter (KF) parameters based on the residual; and estimating, via the KF, a channel state based on the updated KF parameters.

Clause 2. The processor-implemented method of Clause 1, in which the updated KF parameters comprise a sum of a base set of KF parameters and the residual.

Clause 3. The processor-implemented method of Clause 2, further comprising determining a process noise parameter of the base set of KF parameters during training based on a minimum mean square error of a training data set.

Clause 4. The processor-implemented method of any one of Clause 1-2, in which the residual corresponds to temporal variations of the KF parameters.

Clause 5. The processor-implemented method of any one of Clause 1-4, in which the RNN comprises a long short-term memory (LSTM) or a gated recurrent unit (GRU).

Clause 6. The processor-implemented method of any one of Clause 1-5, in which the channel dynamics observations comprise orthogonal frequency-division multiplexing (OFDM) symbols.

Clause 7. The processor-implemented method of any one of Clause 1-6, in further comprising sampling from a hidden state of the KF to produce a synthetic observation in response to a missing channel dynamics observation at one timing of the group of timings, in which the residual at the one timing is based on the synthetic observation.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A processor-implemented method by a communication device, comprising:
   receiving an input sequence comprising a plurality of channel dynamics observations for a wireless communication channel, each channel dynamics observation corresponding to a timing of a plurality of timings;
   determining, via a recurrent neural network (RNN), a residual at each of the plurality of timings based on the plurality of channel dynamics observations;
   updating Kalman filter (KF) parameters based on the residual; and
   estimating, via the KF, a channel state based on the updated KF parameters.

2. The processor-implemented method of claim 1, in which the updated KF parameters comprise a sum of a base set of KF parameters and the residual.

3. The processor-implemented method of claim 2, further comprising determining a process noise parameter of the base set of KF parameters during training based on a minimum mean square error of a training data set.

4. The processor-implemented method of claim 2, in which the residual corresponds to temporal variations of the KF parameters.

5. The processor-implemented method of claim 1, in which the RNN comprises a long short-term memory (LSTM) or a gated recurrent unit (GRU).

6. The processor-implemented method of claim 1, in which the plurality of channel dynamics observations comprise orthogonal frequency-division multiplexing (OFDM) symbols.

7. The processor-implemented method of claim 1, further comprising sampling from a hidden state of the KF to produce a synthetic observation in response to a missing channel dynamics observation at one timing of the plurality of timings, in which the residual at the one timing is based on the synthetic observation.

8. An apparatus at a communication device, comprising:
   a processor; and
   a memory coupled with the processor and storing instructions operable, when executed by the processor, to cause the apparatus:
      to receive an input sequence comprising a plurality of channel dynamics observations for a wireless communication channel, each channel dynamics observation corresponding to a timing of a plurality of timings;
      to determine, via a recurrent neural network (RNN), a residual at each of the plurality of timings based on the plurality of channel dynamics observations;
      to update Kalman filter (KF) parameters based on the residual; and
      to estimate, via the KF, a channel state based on the updated KF parameters.

9. The apparatus of claim 8, in which the updated KF parameters comprise a sum of a base set of KF parameters and the residual.

10. The apparatus of claim 9, in which execution of the instructions further cause the apparatus to determine a process noise parameter of the base set of KF parameters during training based on a minimum mean square error of a training data set.

11. The apparatus of claim 9, in which the residual corresponds to temporal variations of the KF parameters.

12. The apparatus of claim 8, in which the RNN comprises a long short-term memory (LSTM) or a gated recurrent unit (GRU).

13. The apparatus of claim 8, in which the plurality of channel dynamics observations comprise orthogonal frequency-division multiplexing (OFDM) symbols.

14. The apparatus of claim 8, in which execution of the instructions further cause the apparatus to sample from a hidden state of the KF to produce a synthetic observation in response to a missing channel dynamics observation at one timing of the plurality of timings, in which the residual at the one timing is based on the synthetic observation.

15. A non-transitory computer-readable medium having program code recorded thereon at a communication device, the program code executed by a processor and comprising:
program code to receive an input sequence comprising a plurality of channel dynamics observations for a wireless communication channel, each channel dynamics observation corresponding to a timing of a plurality of timings;
program code to determine, via a recurrent neural network (RNN), a residual at each of the plurality of timings based on the plurality of channel dynamics observations;
program code to update Kalman filter (KF) parameters based on the residual; and
program code to estimate, via the KF, a channel state based on the updated KF parameters.

16. The non-transitory computer-readable medium of claim 15, in which the updated KF parameters comprise a sum of a base set of KF parameters and the residual.

17. The non-transitory computer-readable medium of claim 16, in which the program code further comprises program code to determine a process noise parameter of the base set of KF parameters during training based on a minimum mean square error of a training data set.

18. The non-transitory computer-readable medium of claim 16, in which the residual corresponds to temporal variations of the KF parameters.

19. The non-transitory computer-readable medium of claim 15, in which the RNN comprises a long short-term memory (LSTM) or a gated recurrent unit (GRU).

20. The non-transitory computer-readable medium of claim 15, in which the plurality of channel dynamics observations comprise orthogonal frequency-division multiplexing (OFDM) symbols.

21. The non-transitory computer-readable medium of claim 15, in which the program code further comprises program code to sample from a hidden state of the KF to produce a synthetic observation in response to a missing channel dynamics observation at one timing of the plurality of timings, in which the residual at the one timing is based on the synthetic observation.

22. An apparatus at a communication device, comprising:
means for receiving an input sequence comprising a plurality of channel dynamics observations for a wireless communication channel, each channel dynamics observation corresponding to a timing of a plurality of timings;
means for determining, via a recurrent neural network (RNN), a residual at each of the plurality of timings based on the plurality of channel dynamics observations;
means for updating Kalman filter (KF) parameters based on the residual; and
means for estimating, via the KF, a channel state based on the updated KF parameters.

23. The apparatus of claim 22, in which the updated KF parameters comprise a sum of a base set of KF parameters and the residual.

24. The apparatus of claim 23, further comprising means for determining a process noise parameter of the base set of KF parameters during training based on a minimum mean square error of a training data set.

25. The apparatus of claim 23, in which the residual corresponds to temporal variations of the KF parameters.

26. The apparatus of claim 22, in which the RNN comprises a long short-term memory (LSTM) or a gated recurrent unit (GRU).

27. The apparatus of claim 22, in which the plurality of channel dynamics observations comprise orthogonal frequency-division multiplexing (OFDM) symbols.

28. The apparatus of claim 22, further comprising means for sampling from a hidden state of the KF to produce a synthetic observation in response to a missing channel dynamics observation at one timing of the plurality of timings, in which the residual at the one timing is based on the synthetic observation.

* * * * *